United States Patent
Fujiwara et al.

(10) Patent No.: US 10,055,373 B2
(45) Date of Patent: Aug. 21, 2018

(54) REPRODUCTION DEVICE AND REPRODUCTION SYSTEM

(71) Applicants: FUJITSU TEN LIMITED, Kobe-shi, Hyogo (JP); HONDA MOTOR CO., LTD., Tokyo (JP)

(72) Inventors: Takanori Fujiwara, Kobe (JP); Yoshinori Sakabe, Kobe (JP); Atsuyuki Suzuki, Wako (JP); Junichi Hirose, Wako (JP)

(73) Assignees: FUJITSU TEN LIMITED, Kobe-shi (JP); HONDA MOTOR CO., LTD., Tokyo (JP)

(*) Notice: Subject to any disclaimer, the term of this patent is extended or adjusted under 35 U.S.C. 154(b) by 861 days.

(21) Appl. No.: 14/039,362

(22) Filed: Sep. 27, 2013

(65) Prior Publication Data
US 2014/0095761 A1 Apr. 3, 2014

(30) Foreign Application Priority Data
Sep. 28, 2012 (JP) ................... 2012-218326

(51) Int. Cl.
*G06F 13/40* (2006.01)
*H04N 21/436* (2011.01)
*H04N 21/4363* (2011.01)

(52) U.S. Cl.
CPC ....... *G06F 13/4022* (2013.01); *H04N 21/436* (2013.01); *H04N 21/43637* (2013.01)

(58) Field of Classification Search
CPC ............. G06F 13/4022; H04N 21/436; H04N 21/43637
See application file for complete search history.

(56) References Cited

U.S. PATENT DOCUMENTS

| 2003/0105860 A1* | 6/2003 | Tajima | G06F 13/4081 709/224 |
| 2005/0179822 A1* | 8/2005 | Takano | H04N 5/4401 348/705 |

(Continued)

FOREIGN PATENT DOCUMENTS

| CN | 2876837 Y | 3/2007 |
| CN | 101589612 A | 11/2009 |

(Continued)

OTHER PUBLICATIONS

Aug. 19, 2014 Office Action issued in Japanese Application No. 2012-218326 (with translation).

(Continued)

*Primary Examiner* — Tim T Vo
*Assistant Examiner* — Phong H Dang
(74) *Attorney, Agent, or Firm* — Oliff PLC (57) ABSTRACT

A reproduction device includes a reproduction unit, communication paths, and a communication-path control unit. The reproduction unit is configured to be able to alternatively reproduce content items supplied from sources. The communication paths respectively correspond to the sources. The reproduction unit is connected to the sources via the respective communication paths. The communication-path control unit invalidates, when receiving an instruction to switch to the source having content to be reproduced by the reproduction unit, communication via the communication path corresponding to the source before the switching among the communication paths.

11 Claims, 8 Drawing Sheets

(56) References Cited

U.S. PATENT DOCUMENTS

| | | | |
|---|---|---|---|
| 2007/0129116 A1* | 6/2007 | Katoh | H04M 1/6091 |
| | | | 455/569.1 |
| 2008/0218505 A1* | 9/2008 | Choi | G06F 3/14 |
| | | | 345/212 |
| 2009/0104906 A1* | 4/2009 | Lee | H04W 74/08 |
| | | | 455/435.1 |
| 2009/0122201 A1* | 5/2009 | Freundlich | H04N 7/1675 |
| | | | 348/725 |
| 2010/0115433 A1 | 5/2010 | Lee et al. | |
| 2010/0165197 A1* | 7/2010 | Hattori | G09G 5/006 |
| | | | 348/554 |

FOREIGN PATENT DOCUMENTS

| | | |
|---|---|---|
| JP | A-7-147654 | 6/1995 |
| JP | A-2006-086805 | 3/2006 |
| JP | A-2009-111864 | 5/2009 |
| JP | A-2009-194589 | 8/2009 |
| JP | A-2010-226194 | 10/2010 |

OTHER PUBLICATIONS

Jul. 8, 2016 Office Action issued in Chinese Patent Application No. 201310450002.6.

\* cited by examiner

REPRODUCTION DEVICE AND REPRODUCTION SYSTEM

CROSS-REFERENCE TO RELATED APPLICATIONS

This application is based upon and claims the benefit of priority from the prior Japanese Patent Application No. 2012-218326, filed on Sep. 28, 2012, the entire contents of which are incorporated by reference.

FIELD

Embodiments of the present disclosure relate to a reproduction device and a reproduction system.

BACKGROUND

Hitherto, there have been known reproduction devices which are connected to external devices such as mobile phones, smartphones, or digital versatile disc (DVD) players and are capable of alternatively reproducing content supplied from a plurality of sources stored in the external devices (for example, see Japanese Laid-open Patent Publication No. 2006-086805). In recent years, there have been suggested technologies for establishing communication between a plurality of sources and reproduction devices via a plurality of communication paths, such as a Bluetooth (BT) (registered trademark) path, a high-definition multimedia interface (HDMI) path, and a universal serial bus (USB) path, and performing data communication.

However, when the communication is established along the plurality of communication paths in the above-mentioned reproduction devices, a communication path (a communication path of communication established later in order, in other words, the newest communication path) of the communication established finally among the plurality of communication paths of the established communication is used more preferentially than the other communication paths. For this reason, when the content is attempted to be reproduced by switching the plurality of sources, there is a problem in that data may not be supplied from the source corresponding to the communication path other than the communication path of the finally established communication, and thus the content may not be reproduced.

That is, for example, when communication of a BT path is established in a reproduction device so that content of the source corresponding to the BT path can be reproduced and communication of an HDMI path is then established, content of the source corresponding to the HDMI path can be reproduced. In the reproduction device of this state, even when the source is switched to the source corresponding to the BT path again, the HDMI path is preferentially used (in a state in which data can be transmitted and received). Therefore, there is a problem in that data may not be supplied from the source via the BT path, and thus the content may not be reproduced.

SUMMARY

A reproduction device includes a reproduction unit, communication paths, and a communication-path control unit. The reproduction unit is configured to be able to alternatively reproduce content items respectively supplied from sources. The communication paths respectively correspond to the sources. The reproduction unit is connected to the sources via the respective communication paths. The communication-path control unit is configured to invalidate, when receiving an instruction to switch to the source having content to be reproduced by the reproduction unit, communication via the communication path corresponding to the source before the switching among the communication paths.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

First, a first embodiment will be described.

Figure 1:
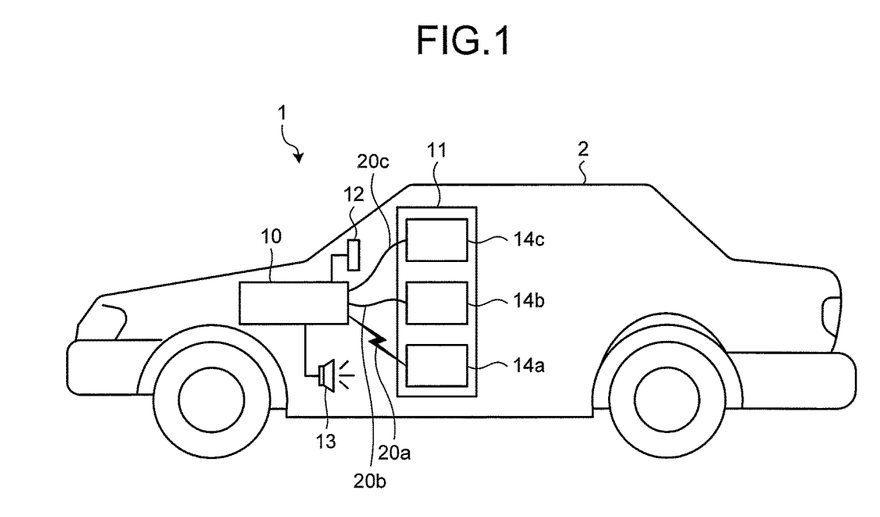
FIG. 1 is a diagram illustrating the overview of a reproduction system according to a first embodiment.

FIG. 1 is a diagram illustrating the overview of a reproduction system 1 according to the first embodiment. As illustrated in FIG. 1, the reproduction system 1 includes a reproduction device 10 mounted on a vehicle 2 such as an automobile and an external device 11 connected so as to freely communicate with the reproduction device 10.

The reproduction device 10 reproduces content supplied from, for example, the external device 11. Examples of the content include information such as musical compositions (music), video, and images, but the details of the content are not limited thereto. The reproduction device 10 includes a display unit 12 and a speaker 13 to reproduce the content.

The display unit 12 includes a display and is disposed at a position which can be recognized by a user riding on the vehicle 2, for example, a position inside a dashboard or the like on the front side of the vehicle. The speaker 13 is disposed at an appropriate position inside the vehicle interior of the vehicle 2. In FIG. 1, one display unit 12 and one speaker 13 included in the display unit 12 are illustrated. However, for example, a plurality of display units and speakers may be disposed near the driver seat and the rear seat in the vehicle interior. The reproduction device 10 may be not only a device fixed in the vehicle interior of the vehicle 2 but also a portable device held in a holder or the like equipped in the vehicle 2. Although the reproduction device 10 is configured to be mounted on the vehicle 2, the embodiment is not limited thereto. The reproduction device may be installed at any place, for example, in other vehicles such as airplanes or trains or at indoor or outdoor places, as long as the reproduction device can reproduce content.

The external device 11 is, for example, a portable electronic device such as a mobile phone or a smartphone and includes a plurality of sources having the content, for example, three sources 14a, 14b, and 14c. Hereinafter, sources denoted by reference numerals 14a, 14b, and 14c are referred to as a "first source 14a," a "second source 14b," and a "third source 14c," respectively.

The first source 14a, the second source 14b, and the third source 14c each store content to be reproduced via mutually different kinds of communication paths among a plurality of communication paths (transmission paths) to be described below. For example, the first source 14a stores content to be reproduced via a Bluetooth (BT) (registered trademark) path among the plurality of communication paths. The second source 14b stores content to be reproduced via, for example, a high-definition multimedia interface (HDMI) path among the plurality of communication paths and the third source 14c stores content to be reproduced via, for example, a universal serial bus (USB) path among the plurality of communication paths.

One external device 11 is configured to include all of the first source 14a, the second source 14b, and the third source 14c. However, for example, when a plurality of external devices are provided, one of the plurality of external devices may be configured to include one or two sources among the first source 14a, the second source 14b, and the third source 14c and the remaining external devices may include the remaining sources. Further, the external device 11 is not limited to the above-described mobile phone, but any external device such as a DVD player, a portable game device, or a tablet terminal may be used as long as the external device can reproduce the content.

When the external device 11 is used in the reproduction system 1, the external device 11 is fixed to the dashboard of the vehicle 2 by a holder (not illustrated) holding the external device 11. The holder is detachably mounted by the user and may not completely fix the external device 11.

Figure 2:
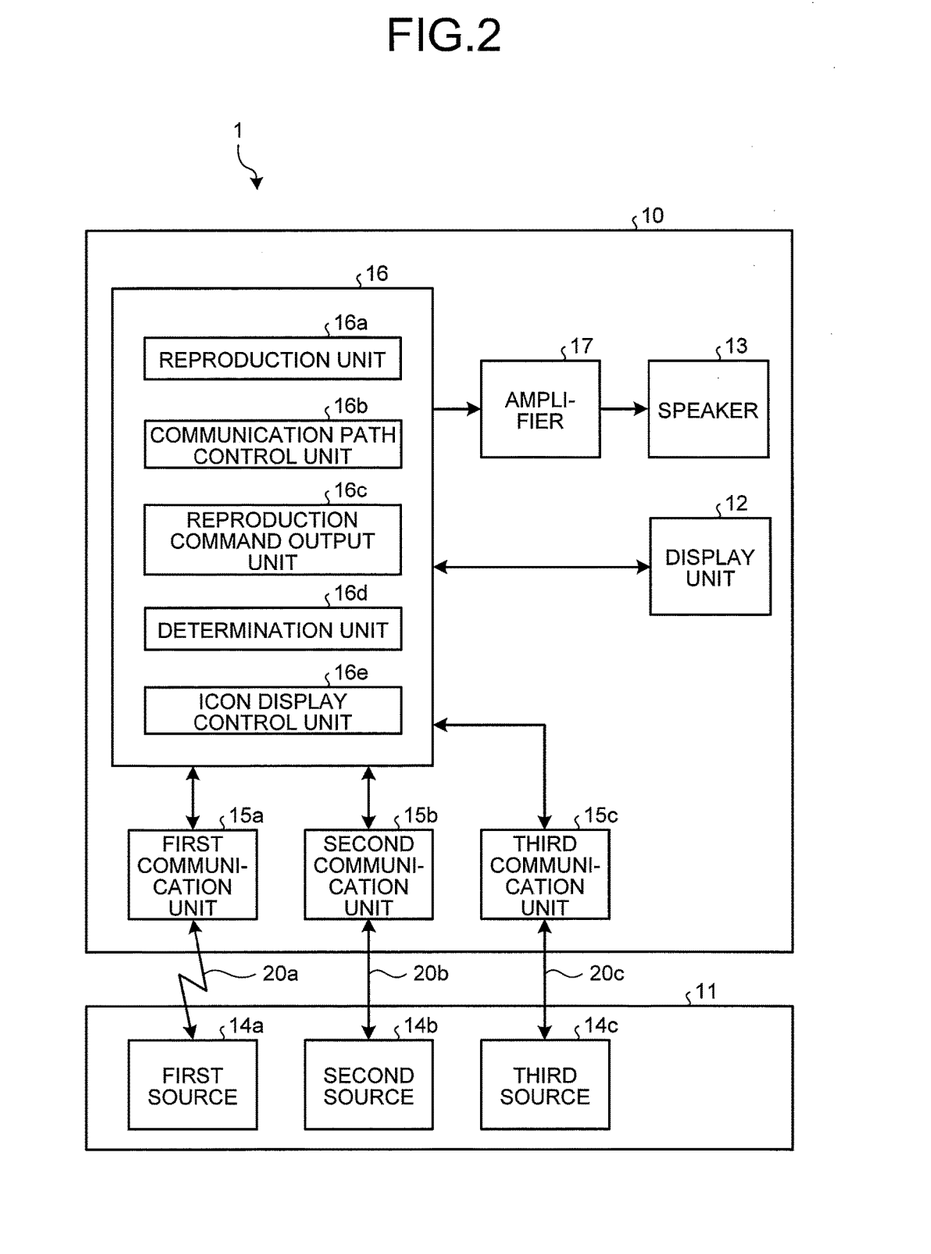
FIG. 2 is a block diagram illustrating the configuration of the reproduction system illustrated in FIG. 1.

FIG. 2 is a block diagram illustrating the configuration of the reproduction system 1 illustrated in FIG. 1. As illustrated in FIG. 2, the first source 14a, the second source 14b, and the third source 14c included in the external device 11 are connected to the reproduction device 10 via the plurality of communication paths corresponding to the first source 14a, the second source 14b, and the third source 14c, for example, via a first communication path 20a, a second communication path 20b, and a third communication path 20c, respectively. Specifically, the first communication path 20a corresponds to the first source 14a and is a BT path for wireless communication. The second communication path 20b corresponds to the second source 14b and is an HDMI path for wired communication using a communication cable or the like. The third communication path 20c corresponds to the third source 14c and is a USB path for wired communication using a communication cable or the like.

Thus, the reproduction device 10 connected via the plurality of communication paths 20a, 20b, and 20c transmits and receives data preferentially via the communication path (a communication path of communication established later in order, in other words, the newest communication path) of the finally established communication, as will be described below. Thus, when the communication path of the finally established communication is used more preferentially than the communication path of the previously established communication and content is attempted to be reproduced by switching the plurality of sources, there is a problem that data is not supplied from the source corresponding to the communication path other than the communication path of the finally established communication and the content may not be reproduced.

That is, for example, when the communication of the first communication path is established in the reproduction device so that the content of the first source can be reproduced and the communication of the second communication path is then established, the content of the second source can be reproduced. In the reproduction device of this state, even when the source is switched to the first source again, the second communication path is preferentially used (in a state in which data can be transmitted and received). Therefore, there is a problem that data may not be supplied from the first source and the content may not be reproduced.

Accordingly, when receiving an instruction to switch the source, the reproduction device 10 and the reproduction system 1 according to this embodiment are configured to newly establish communication by cancelling the establishment state of the communication via the communication path corresponding to the source before switching or the connected state (invalidating the communication) and establishing the communication state of the communication path corresponding to a switching destination source or the connection state (validating the communication). That is, when the source is switched, the communication state or the connection state of the communication path corresponding to the source before switching is cancelled (disconnected) and the communication state or the connection state of the communication path corresponding to the switching destination source is newly established, so that data can be reliably supplied from the source after switching, and thus the content can be reliably reproduced.

Here, the establishment of the communication will be described. The establishment of the communication is a process which is performed so that communication can be performed between specific devices. Specifically, the establishment of the communication is a process of storing parameters used to perform various kinds of setting (codes or communication channels for device identification, a communication mode such as frequency hopping, or the like) between devices performing communication in a memory and operating the devices based on the stored parameters. In such a configuration, the establishment of the communication is normally not cancelled, although the communication is merely interrupted in association with the switching of the sources. That is, operation of newly switching the source is merely an operation of forming an interruption state of the communication rather than cancellation of the establishment of the communication.

Accordingly, in the reproduction device 10 and the reproduction system 1 according to this embodiment, establishment of communication is realized again when establishment of communication is cancelled (or regarded as being cancelled) in association with switching of a source and a source is selected again. More specifically, the establishment of the communication in association with the switching of the source may not necessarily be cancelled. The establishment of the communication may be cancelled by the source is selected again.

Referring back to FIG. 2 to continue the description, the reproduction device 10 of the reproduction system 1 is an electronic control device that includes a first communication unit 15a, a second communication unit 15b, a third communication unit 15c, a control unit 16, an amplifier 17, the above-described display unit 12, and the above-described speaker 13.

The first communication unit 15a is connected so as to communicate with the first source 14a of the external device 11 via the first communication path 20a, and transmits and receives content data stored in the first source 14a, data used for an authentication process, or the like. For example, the first communication unit 15a performs a pairing process including authentication or the like to establish communication with the external device 11.

The second communication unit 15b is connected so as to communicate with the second source 14b via the second communication path 20b, and transmits and receives data such as the content of the second source 14b. The third communication unit 15c is connected so as to communicate with the third source 14c via the third communication path 20c, and transmits and receives data such as the content of the third source 14c.

The control unit 16 includes a CPU, RAM, and ROM and is a microcomputer that controls the entire reproduction device 10. The control unit 16 includes a reproduction unit 16a, a communication-path control unit 16b, a reproduction command output unit 16c, a determination unit 16d, and an icon display control unit 16e. Information such as the contents supplied from the first source 14a, the second source 14b, and the third source 14c described above is input via the first communication unit 15a, the second communication unit 15b, and the third communication unit 15c.

The reproduction unit 16a is configured to alternatively reproduce the content supplied from the first source 14a, the second source 14b, and the third source 14c. Specifically, the reproduction unit 16a reproduces the content by outputting a sound signal of the content of one source which the user selects among the plurality of supplied content pieces to the amplifier 17. In the reproduction of the content, a video signal may be output and displayed on the display unit 12 according to the details of the content, or both of the sound signal and the video signal may be output.

The communication-path control unit 16b performs control such that validation and invalidation of the communication of the first communication path 20a and the second communication path 20b are switched with each other. Here, the validation of the communication means that a connected communication path is enabled to realize a communicable state (to establish a communication state or a connection state of the communication path). The invalidation of the communication means that a communication path itself is connected, but is disabled to realize an incommunicable state (to cancel the communication state or the connection state of the established communication path).

That is, when the communication is validated, the data of the content is supplied from each of the sources 14a, 14b, and 14c of the external device 11 to the control unit 16 of the reproduction device 10. Therefore, the content can be reproduced by the reproduction unit 16a of the reproduction device 10. On the other hand, when the communication is invalidated, the data of the content is not supplied from each of the sources 14a, 14b, and 14c of the external device 11 to the control unit 16 of the reproduction device 10. Therefore, the content may not be reproduced by the reproduction unit 16a of the reproduction device 10.

The invalidation of the communication of the first communication path 20a is performed by invalidating some of a plurality of given communication profiles. Specifically, in a case of the BT path which is the first communication path 20a, an audio/video profile (AVP) is invalidated among profiles such as the AVP, a hands-free profile (HFP), and a phone book access profile (PBAP) and the other profiles such as the HFP remain validated. In a case of the HDMI path which is the second communication path 20b, Rx-Power (reception power) is invalidated and Hot Plug Detect (hot plug detection) remains validated, so that the communication of the second communication path 20b is invalidated. The third communication path 20c is not invalidated, as will be described below.

For example, when the plurality of communication paths are sequentially connected, the communication-path control unit 16b uses the communication path of the finally established communication among the plurality of communication paths more preferentially than the communication path of the previously established communication (hereinafter, preferentially using the communication path of the finally established communication is referred to as "later preference"). Thus, the content of the source corresponding to the communication path of the finally established communication is reproduced by the reproduction unit 16a. In the present specification, the "the communication path of the finally established communication" means the communication path of the communication established latest in order among the plurality of communication paths, in other words, the communication path of the most newly established communication. In the present specification, the "using of the communication path" means that transmission and reception of data or the like via the communication path are performed.

As will be described below, when receiving an instruction to switch the source having the content to be reproduced by the reproduction unit 16a, the communication-path control unit 16b invalidates the communication via the communication path corresponding to the source before the switching among the plurality of communication paths 20a and 20b, that is, cancels the establishment state or the connection state of the communication via the communication path before switching.

When receiving the instruction to switch the source, the communication-path control unit 16b newly establishes communication by validating the communication path corresponding to the source after switching, that is, establishing the communication state or the connection state of the communication path corresponding to the source after switching. As described above, the establishment of the communication state is performed when the communication-path control unit 16b of the reproduction device 10 performs the various kinds of setting with the external device 11 including the source corresponding to the communication path via which the communication is established. For example, the communication-path control unit 16b establishes the communication via the communication path by setting authentication of the code for the device identification transmitted from the external device 11 or a communication mode (a communication channel, frequency hopping, or the like) based on various parameters stored in the memory (not illustrated).

The communication-path control unit 16b exceptionally sets one of the plurality of communication paths 20a, 20b, and 20c as a communication path for which the establishment state of the communication is not cancelled, that is, the communication is not invalidated, even when receiving the instruction to switch the source. Here, for example, the third communication path 20c is set as the communication path for which the communication is not invalidated. The communication path for which the communication is not invalidated is not limited to the third communication path 20c, but the first communication path 20a or the second communication path 20b may be set. The invalidation and the validation of the communication via the communication path at the time of the switching of the source described above will be described in detail below.

As another embodiment, the external device 11 may include the communication-path control unit 16b. In this case, as in the above-described embodiment, the validation and the invalidation of the establishment of the communication via the communication path are not controlled on the side of the reproduction device 10, but the validation and the invalidation of the establishment of the communication via the communication path is controlled on the side of the external device 11.

Specifically, for example, when receiving the instruction to switch the source, the control unit 16 transmits a switching request signal used to request the switching of the source to the communication-path control unit of the external device 11 via the communication path for which the communication is established between the reproduction device 10 and the external device 11. Then, when receiving the switching request signal, the communication-path control unit of the external device 11 performs a process of forming a new establishment state of the communication by invalidating the communication via the communication path corresponding to the source that stores the content data transmitted and received before the reception of the switching request signal and validating the communication path corresponding to the source after switching.

The reproduction command output unit 16c outputs a command to reproduce the content of the source after switching to the reproduction unit 16a and causes the reproduction unit 16a to reproduce the content supplied from the source. The determination unit 16d determines whether the content is reproduced by the reproduction unit 16a. Specifically, the determination unit 16d outputs a command to confirm the reproduction of the content, more specifically, a command to confirm whether the content is being reproduced or is being temporarily interrupted, to the external device 11. Then, the determination unit 16d determines whether the content is reproduced by the reproduction unit 16a based on a signal indicating the reproduction state or the interruption state of the content, which is replied from the external device 11.

As another embodiment, the determination unit 16d may be configured to output the command to confirm the reproduction of the content to the reproduction unit 16a and determine whether the content is reproduced by the reproduction unit 16a based on a signal indicating the reproduction state or the temporary interruption state of the content which is replied from the reproduction unit 16a.

Figure 3:
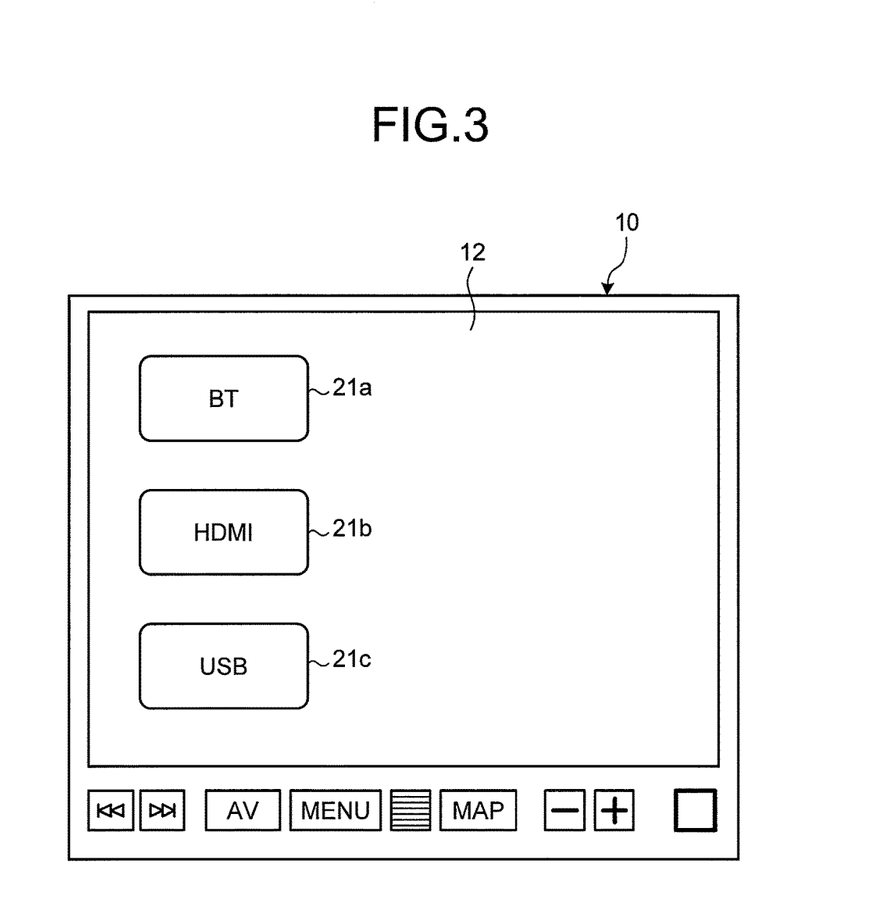
FIG. 3 is a diagram illustrating examples of icons displayed on a display unit illustrated in FIG. 1.

The icon display control unit 16e causes the display unit 12 to display a plurality of icons corresponding to the connected first source 14a, the connected second source 14b, and the connected third source 14c, specifically, a first icon 21a, a second icon 21b, and a third icon 21c. FIG. 3 is a diagram illustrating examples of the first icon 21a, the second icon 21b, and the third icon 21c displayed on the display unit 12.

As illustrated in FIG. 3, the first icon 21a displays "BT," which is the communication path corresponding to the first source 14a, in an identifiable manner on the display unit 12. The second icon 21b displays "HDMI," which is the communication path corresponding to the second source 14b, in an identifiable manner. The third icon 21c displays "USB," which is the communication path corresponding to the third source 14c, in an identifiable manner. The first icon 21a, the second icon 21b, and the third icon 21c may display the first source 14a, the second source 14b, and the third source 14c in an identifiable manner, respectively. Thus, the user can easily comprehend the kinds of sources and communication paths connected to the reproduction device 10, just viewing the display unit 12.

The display unit 12 on which the first icon 21a, the second icon 21b, and the third icon 21c are displayed can be configured to include a touch panel so as to receive a user's operation. Specifically, when the user touches the display unit 12 as the touch panel, the control unit 16 detects the content of the user's operation based on a position at the coordinates on the display unit 12 touched by the user. Accordingly, when the user touches the first icon 21a, the control unit 16 receives an instruction to switch the content reproduced by the reproduction device 10 to the content supplied from the first source 14a. Likewise, when the user touches the second icon 21b, the control unit 16 receives an instruction to switch the content to the content of the second source 14b. Further, when the user touches the third icon 21c, the control unit 16 receives an instruction to switch the content to the content of the third source 14c.

The above-described instructions to switch the source are not limited to operations of icons. An operation of a button installed near the reproduction device 10, an operation of the side of the external device 11, a sound of a user, or the like may be received as the instruction for switching the source.

The amplifier 17 amplifies a sound signal interposed between the control unit 16 and the speaker 13 and output from the reproduction unit 16a of the control unit 16, and outputs the amplified audio signal to the speaker 13 to output a sound. In other words, the content is reproduced.

Figure 4:
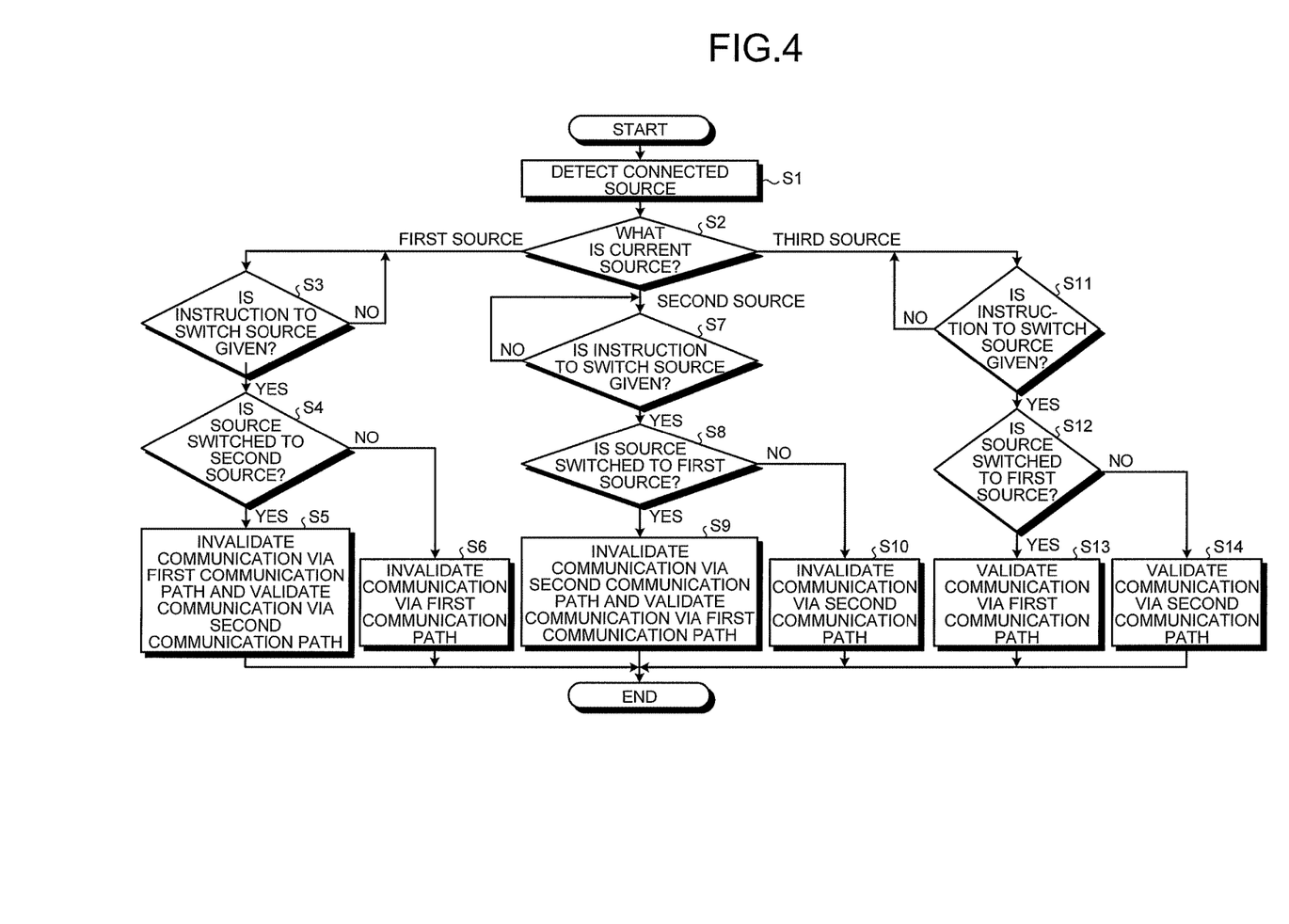
FIG. 4 is a flowchart illustrating an operation of a control unit of a reproduction device illustrated in FIG. 2.

FIG. 4 is a flowchart illustrating an operation of the control unit 16 of the reproduction device 10 described above. As illustrated in FIG. 4, the control unit 16 first detects the source connected to the reproduction unit 16a of the reproduction device 10 (step S1). In this embodiment, the control unit 16 is assumed to detect that the first source 14a, the second source 14b, and the third source 14c are connected via the first communication path 20a, the second communication path 20b, and the third communication path 20c.

Subsequently, it is detected whether the source corresponding to the content reproduced by the reproduction unit 16a is currently one of the first source 14a, the second source 14b, and the third source 14c (step S2). When the current source is the first source 14a in step S2, the control unit 16 subsequently determines whether an instruction to switch the source having the content reproduced by the reproduction unit 16a is received through the icons 21a, 21b, and 21c of the display unit 12 (step S3).

When the current source is the first source 14a, the reproduction device 10 enters a state in which the communication via the first communication path 20a corresponding to the first source 14a is finally established, for example, a state in which the current source is switched to the first source 14a and the communication via the first communication path 20a is thus established when the process of FIG. 4 is performed at the previous time. Therefore, the communication state of the reproduction device 10 is a state (a state in which the first communication path 20a is preferentially used) in which communication via the first communication path 20a and the third communication path 20c is established and data can be transmitted and received via the first communication path 20a.

When the control unit 16 determines that the instruction to switch the source is not received (No in step S3), the process of step S3 is repeated. Conversely, when the control unit 16 determines that the instruction to switch the source is received (Yes in step S3), the control unit 16 determines whether the instruction to switch the source is an instruction to switch the first source 14a to the second source 14b (step S4).

When the instruction to switch the source is the instruction to switch the first source 14a to the second source 14b (Yes in step S4), the communication-path control unit 16b invalidates the communication via the first communication path 20a corresponding to the first source 14a which is the source before switching and validates the communication via the second communication path 20b corresponding to the second source 14b which is the source after switching.

Thus, in the communication state of the reproduction device 10, the communications via the second communication path 20b and the third communication path 20c is established and the communication via the second communication path 20b is finally established. In other words, since the second communication path 20b is established later than the third communication path 20c, the data can be transmitted and received via the second communication path 20b. Therefore, the state in which the data is reliably supplied from the second source 14b after switching is realized, and thus the content supplied from the second source 14b corresponding to the second communication path 20b can be reliably reproduced by the reproduction unit 16a.

Even when the communication via the first communication path 20a is invalidated in step S5, the icon display control unit 16e causes the display unit 12 to continuously display the first icon 21a of the first source 14a corresponding to the first communication path 20a for which the communication is invalidated. Accordingly, the user can recognize the currently connected communication path, irrespective of whether the communication via the communication path is validated or invalidated, and thus can easily give the instruction to switch the source corresponding to the connected communication path. Further, likewise, the icon display control unit 16e causes the display unit 12 to continuously display the second icon 21b of the second source 14b corresponding to the second communication path 20b, even when the communication via the second communication path 20b is invalidated, as will be described below.

Conversely, when the instruction to switch the source is not the instruction to switch the first source 14a to the second source 14b (No in step S4), that is, when the instruction to switch the source is an instruction to switch the first source 14a to the third source 14c, the communication via the first communication path 20a corresponding to the first source 14a which is the source before switching is invalidated (step S6). Thus, in the communication state of the reproduction device 10, the communication via the third communication path 20c is established. Thus, a state in which the data is reliably supplied from the third source 14c after switching to the reproduction device 10 is realized, and thus the content supplied from the third source 14c corresponding to the third communication path 20c can be reliably reproduced by the reproduction unit 16a.

When the content of the second source 14b or the third source 14c are reproduced after the process of step S5, step S6, or the like, an instruction to perform a pairing process and make connection to the first source 14a is input from the user in some cases. In this case, since the communication via the first communication path 20a is established and the data is transmitted and received, the content of the second source 14b or the third source 14c are not reproduced. Thus, when the pairing process ends, the communication-path control unit 16b invalidates the communication via the first communication path 20a and validates the second communication path 20b or the third communication path 20c to establish the communication so that the reproduction of the content of the second source 14b or the third source 14c resumes. However, since the content of the second source 14b or the third source 14c are not reproduced for a short time until the invalidation of the communication via the first communication path 20a, the control unit 16 displays a pop-up indication showing that the first source 14a is being connected (communication is being established) for the short time on the display unit 12 to inform the user the reason why the content is not reproduced.

Once the connection of the first source 14a is set through the paring process, connection search of the first source 14a is performed whenever a key (not illustrated) of the vehicle 2 is turned up to the position of ACC-ON (accessory-on) and power is supplied. Even in this case, as described above, the content of the second source 14b or the third source 14c is not reproduced. Therefore, until the connection search ends, the control unit 16 displays a pop-up indication showing the connection search of the first source 14a. Then, the control unit 16 invalidates the communication of the first communication path 20a immediately after the end of the connection search and validates the second communication path 20b or the third communication path 20c to establish the communication so that the reproduction of the content of the second source 14b or the third source 14c resumes.

Referring back to FIG. 4 to continue the description, when it is detected in step S2 that the current source is the second source 14b, the control unit 16 determines whether an instruction to switch the source is received as in step S3 (step S7). When the current source is the second source 14b, the reproduction device 10 enters a communication state in which the communication via the second communication path 20b and the third communication path 20c is established and the data can be transmitted and received via the second communication path 20b between the second communication path 20b and the third communication path 20c.

When the control unit 16 determines that the instruction to switch the source is not received (No in step S7), the process of step S7 is repeated. Conversely, when the control unit 16 determines that the instruction to switch the source is received (Yes in step S7), the control unit 16 determines whether the instruction to switch the source is an instruction to switch the second source 14b to the first source 14a (step S8).

When the instruction to switch the source is an instruction to switch the second source 14b to the first source 14a (Yes in step S8), the communication-path control unit 16b invalidates the communication via the second communication path 20b corresponding to the second source 14b which is the source before switching and validates the communication via the first communication path 20a corresponding to the first source 14a which is the source after switching.

Thus, in the communication state of the reproduction device 10, the communications via the first communication path 20a and the third communication path 20c is established and the communication via the first communication path 20a is finally established. In other words, since the first communication path 20a is established later than the third communication path 20c, the data can be transmitted and received via the first communication path 20a. Therefore, the state in which the data is reliably supplied from the first source 14a after switching is realized, and thus the content supplied from the first source 14a corresponding to the first communication path 20a can be reliably reproduced by the reproduction unit 16a.

Conversely, when the instruction to switch the source is not the instruction to switch to the first source 14a (No in step S8), that is, when the instruction to switch the source is an instruction to switch to the third source 14c, the communication via the second communication path 20b corresponding to the second source 14b which is the source before switching is invalidated (step S10). Thus, in the communication state of the reproduction device 10, the communication via the third communication path 20c is established. Thus, a state in which the data is reliably supplied from the third source 14c after switching to the reproduction device 10 is realized, and thus the content supplied from the third source 14c corresponding to the third communication path 20c can be reliably reproduced by the reproduction unit 16a.

Further, when it is detected in step S2 that the current source is the third source 14c, the control unit 16 determines whether an instruction to switch the source is received as in step S3 or step S7 (step S11). When the current source is the third source 14c, the reproduction device 10 enters a communication state in which the communication via the third communication path 20c is established.

When the control unit 16 determines that the instruction to switch the source is not received (No in step S11), the process of step S11 is repeated. Conversely, when the control unit 16 determines that the instruction to switch the source is received (Yes in step S11), the control unit 16 determines whether the instruction to switch the source is an instruction to switch the third source 14c to the first source 14a (step S12).

When the instruction to switch the source is an instruction to switch to the first source 14a (Yes in step S12), the communication-path control unit 16b validates the communication via the first communication path 20a corresponding to the first source 14a which is the source after switching.

Thus, in the communication state of the reproduction device 10, the communications via the first communication path 20a and the third communication path 20c is established and the communication via the first communication path 20a is finally established. In other words, since the first communication path 20a is established later than the third communication path 20c, the data can be transmitted and received via the first communication path 20a. Therefore, the state in which the data is reliably supplied from the first source 14a after switching is realized, and thus the content supplied from the first source 14a corresponding to the first communication path 20a can be reliably reproduced by the reproduction unit 16a.

Conversely, when the instruction to switch the source is not the instruction to switch to the first source 14a (No in step S12), that is, when the instruction to switch the source is an instruction to switch to the second source 14b, the communication via the second communication path 20b corresponding to the second source 14b which is the source after switching is validated. Thus, in the communication state of the reproduction device 10, since the communication via the second communication path 20b and the third communication path 20c is established and the communication via the second communication path 20b is finally established, the data via the second communication path 20b can be transmitted and received. Therefore, the content supplied from the second source 14b corresponding to the second communication path 20b can be reliably reproduced by the reproduction unit 16a.

The case has been exemplified above in which the three sources, the first source 14a, the second source 14b, and third source 14c are connected to the reproduction unit 16a of the reproduction device 10, but the embodiment is not limited thereto. Two source or at least four sources may be used. That is, for example, when the sources are two, the first source 14a and the second source 14b, this embodiment can be applied by deleting the processes of step S4, step S6, step S8, step S10, and step S11 to step S14 in FIG. 4.

Figure 5:
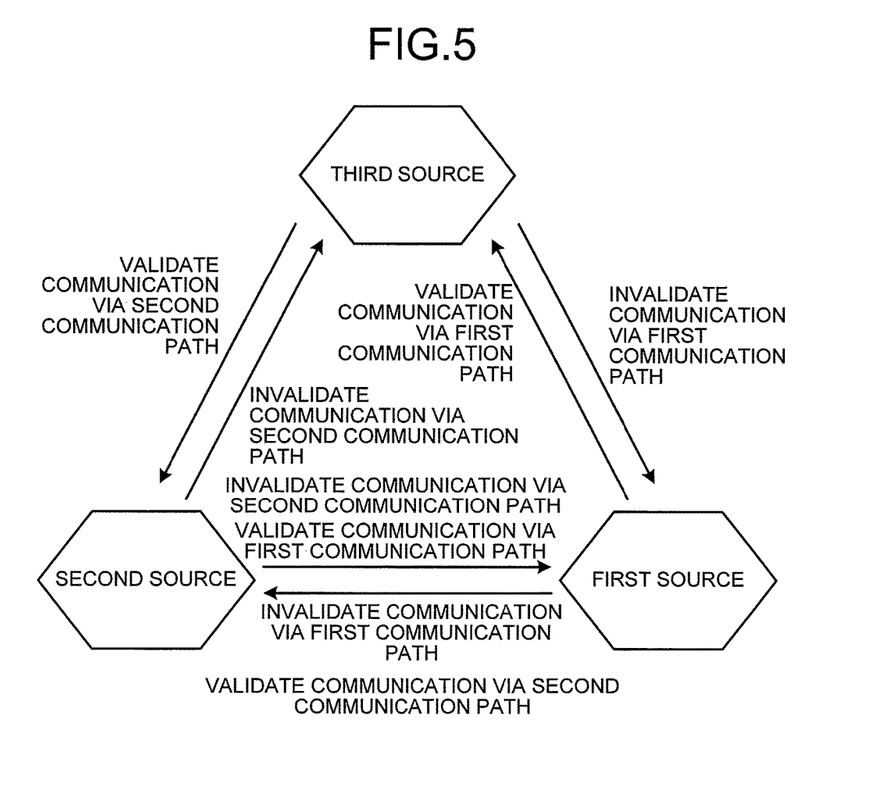
FIG. 5 is a diagram illustrating switching of first to third sources illustrated in FIG. 1.

FIG. 5 is a diagram illustrating the switching of the first source 14a, the second source 14b, and the third source 14c described above. When the description is made simply again with reference to FIG. 5, the communication via the first communication path 20a is invalidated and the communication via the second communication path 20b is validated when the source is switched from the first source 14a to the second source 14b. The communication via the first communication path 20a is invalidated when the source is switched from the first source 14a to the third source 14c.

The communication via the second communication path 20b is invalidated and the communication via the first communication path 20a is validated when the source is switched from the second source 14b to the first source 14a. The communication via the second communication path 20b is invalidated when the source is switched from the second source 14b to the third source 14c. The communication via the first communication path 20a is validated when the source is switched from the third source 14c to the first source 14a. The communication via the second communication path 20b is validated when the source is switched to the second source 14b.

Figure 6:
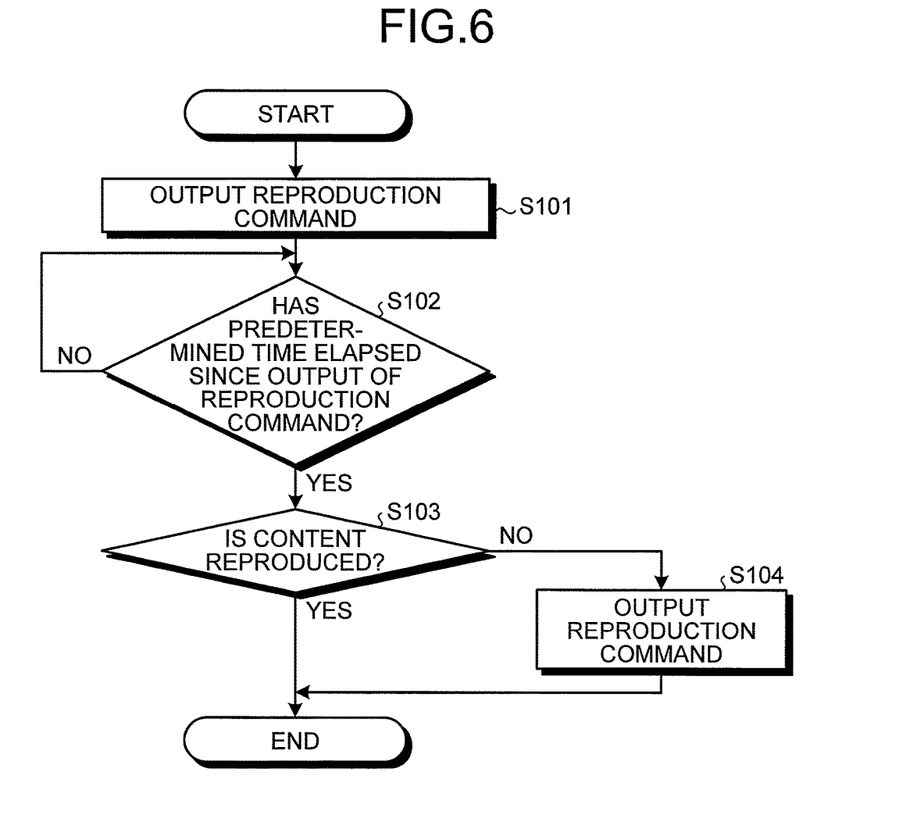
FIG. 6 is a flowchart illustrating a content reproduction process performed by the control unit of the reproduction device illustrated in FIG. 2.

Next, the content reproduction process performed by the control unit 16 of the reproduction device 10 will be described with reference to FIG. 6. FIG. 6 is a flowchart illustrating content reproduction process. The reproduction process is performed after communication via the communication path in steps S5, S6, S9, S10, S13, and S14 of FIG. 4 is invalidated or validated and the source is switched.

As illustrated in FIG. 6, the reproduction command output unit 16c of the control unit 16 first outputs a reproduction command to reproduce the content of the source after switching to the reproduction unit 16a (step S101), so that the content supplied from the source after switching is reproduced by the reproduction unit 16a. Then, the determination unit 16d of the control unit 16 determines whether a predetermined time elapses since the output of the reproduction command by the reproduction command output unit 16c (step S102). Here, a time necessary to stabilize the processing state of the external device 11, for example, after the switching of the source is set as the predetermined time. For example, 6 seconds are considered.

When the predetermined time has not elapsed since the output of the reproduction command (No in step S102), the process returns to the process of step S102. Conversely, when the predetermined time has elapsed (Yes in step S102), the determination unit 16d determines whether the content in the external device 11 is reproduced (step S103).

When the determination unit 16d determines that the content is reproduced (Yes in step S103), the present process directly ends. Conversely, when the determination unit 16d determines that the content is not reproduced (No in step S103), the reproduction command is output again (step S104). Thus, the reproduction unit 16a can more reliably reproduce the content supplied from the source after switching.

That is, for example, depending on a kind of external device 11, there is a concern that the processing state is not stabilized and the content may not be reproduced with the reproduction command output in step S101 immediately after switching of the source. Thus, in this embodiment, when the predetermined time has elapsed since the output of the reproduction command from the reproduction command output unit 16c, it is determined whether the content is reproduced. When it is determined that the content is not reproduced, the reproduction command is configured to be output again. Accordingly, even when the external device 11 is a device of which a processing state is not stabilized immediately after the switching of the source, the reproduction unit 16a can more reliably reproduce the content supplied from the source after switching.

In the first embodiment, as described above, the reproduction device 10 and the reproduction system 1 is configured to invalidate the communication via the communication path corresponding to the source before the switching among the plurality of communication paths 20a, 20b, and 20c, when an instruction to switch the sources 14a, 14b, and 14c having the content to be reproduced by the reproduction unit 16a is received. Therefore, the content supplied from the source after switching can be reliably reproduced.

Next, a second embodiment will be described.

Figure 7:
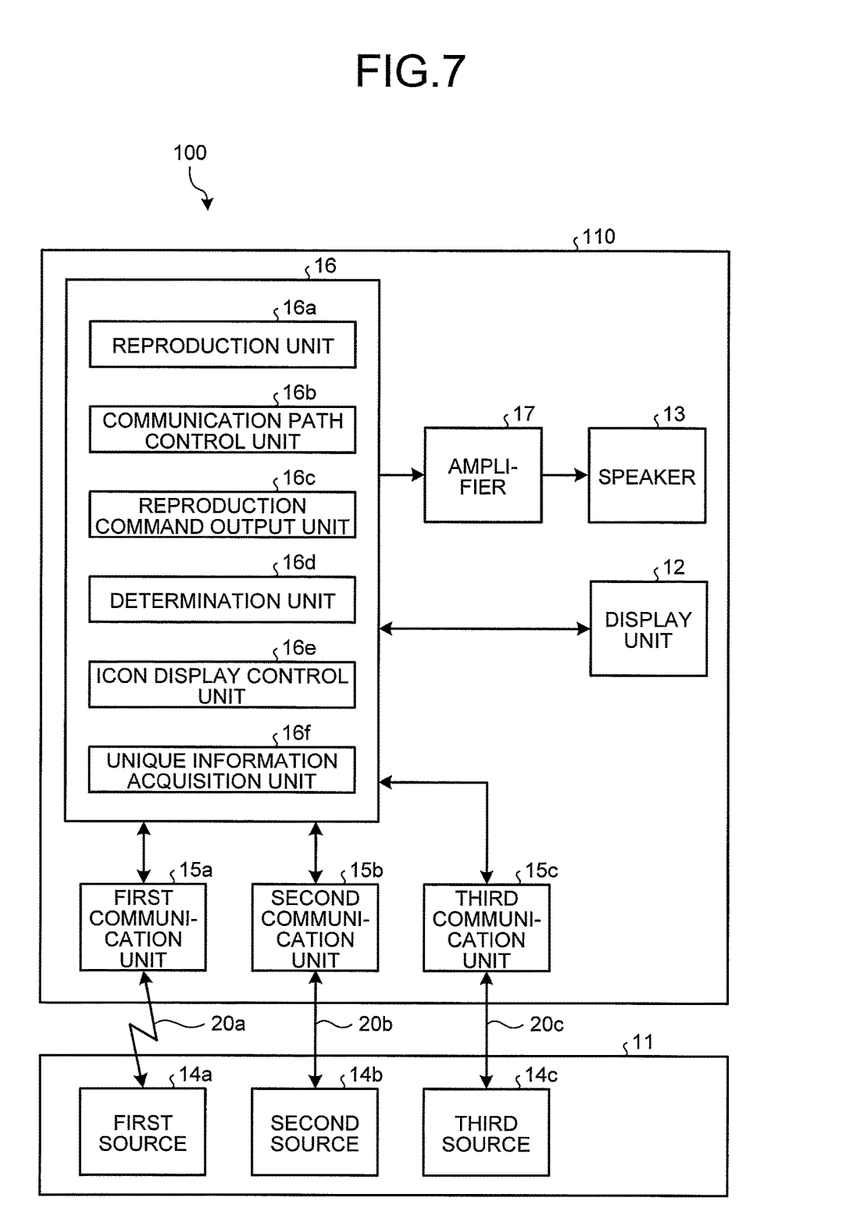
FIG. 7 is a block diagram illustrating the configuration of a reproduction system according to a second embodiment.

FIG. 7 is a block diagram illustrating the configuration of a reproduction system 100 according to a second embodiment, as in FIG. 2. In the following description, the same reference numerals are given to constituent elements having the same configuration as the configuration of the first embodiment and the description thereof will not be made.

As illustrated in FIG. 7, in the reproduction system 100 according to the second embodiment, the control unit 16 of the reproduction device 110 further includes a unique information acquisition unit 16f. The unique information acquisition unit 16f acquires unique information of an external device 11. Here, the unique information is, for example, a model number or a serial number of the external device 11.

Figure 8:
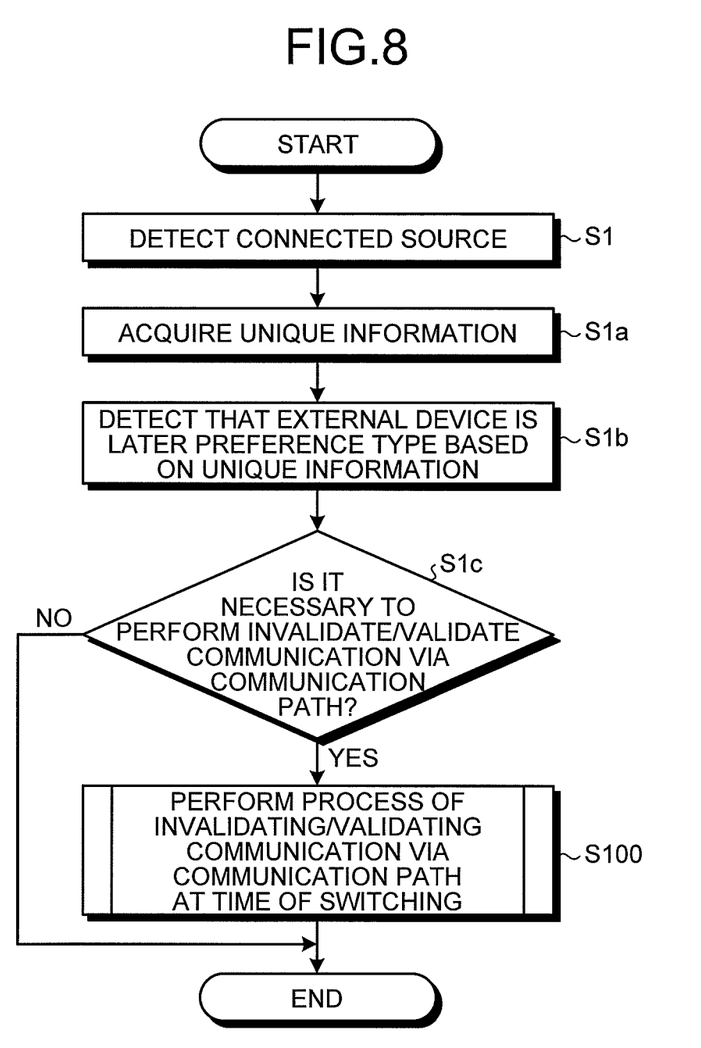
FIG. 8 is a flowchart illustrating an operation of a control unit of a reproduction device illustrated in FIG. 7.

FIG. 8 is a flowchart illustrating an operation of the control unit 16 of the reproduction device 110 of the reproduction system 100 illustrated in FIG. 7, as in FIG. 4. In FIG. 8, the same step numbers are given to the same process as the process of the first embodiment to make description and the description thereof will not be made. In FIG. 8, the processes from step S2 to step S14 of FIG. 4, specifically, the processes of validating or invalidating the communication via each communication path performed at the time of the switching of the source are collectively indicated as "processes of invalidating/validating communication via the communication path at the time of the switching of the source" of step S100.

As illustrated in FIG. 8, when the process of step S1 ends, the unique information acquisition unit 16f of the control unit 16 acquires the unique information of the external device 11 (step S1a). Subsequently, based on the acquired unique information, the control unit 16 detects whether the "later preference type" in which the communication path of the finally established communication is used more preferentially than the communication path of the previously established communication by the external device 11 (step S1b).

More specifically, the types of external devices are classified into the above-described later preference type and an "automatic switching type" in which a communication path via which data is transmitted and received (used) is automatically switched to a communication path corresponding to a source after switching when the reproduction device 110 receives an instruction to switch the source. Thus, the unique information (that is, a model number or the like) of the external device of the later preference type is mapped and is stored in advance in the ROM of the control unit 16. In step S1b, the map is retrieved based on the unique information and it is detected whether the external device 11 is configured to be the later preference type.

Subsequently, the communication-path control unit 16b of the control unit 16 determines whether the process of validating or invalidating the communication via the communication path at the time of the switching of the source described above is necessary based on the type of external device 11 (step S1c). More specifically, in step S1c, when the external device 11 is of the later preference type, as described in the first embodiment, there is a problem that the content supplied from the source after switching is not reproduced when the source is switched. For this reason, in the case of the later preference type, it is necessary to perform the process of validating or invalidating the communication via the communication path.

On the other hand, when the external device 11 is of the automatic switching type, the communication path corresponding to the source after switching is automatically selected at the time of the switching of the source and the data is transmitted and received. Therefore, the problem that the content of the source after switching is not reproduced does not occur. Accordingly, in the case of the automatic switch time, it is not necessary to perform the process of invalidating or validating the communication via the communication path.

That is, in step S1c, when the external device 11 is of the later preference type, it is determined that it is necessary to perform the process of invalidating or validating the communication via the communication path at the time of the switching of the source. On the other hand, when the external device 11 is of the automatic switching type, it is determined that it is not necessary to perform the process of invalidating or validating the communication via the communication path. Thus, depending on the type of external device 11 obtained according to the unique information, the communication-path control unit 16b determines whether the communication via the communication path corresponding to the source before switching is invalidated.

When the control unit 16 determines that it is necessary to perform the process of invalidating or validating the communication via the communication path (Yes in step S1c), the process proceeds to step S100 and the process of invalidating or validating the communication via the communication path is performed. Conversely, when it is determined that it is not necessary to perform the process of invalidating or validating the communication via the communication path (No in step S1c), the process of step S100 is not performed and the present process directly ends.

The unique information acquired in step S1a is not limited to the model number of the external device 11. For example, the unique information may be information indicating whether the external device 11 is of the later preference type or of the automatic switch type. In this case, the process of step S1b may not be performed.

In the second embodiment, as described above, the unique information of the external device 11 is acquired and the communication via the communication path corresponding to the source before switching is determined to be invalidated according to the acquired unique information. Therefore, the control unit 16 can be allowed to correspond to various types of external device. Further, by performing the process of invalidating or validating the communication via the communication path when this process is necessary and not performing this process when this process is not necessary, the processing load of the control unit 16 can be reduced, thereby achieving a high speed.

In the above-described second embodiment, it is determined whether the process of invalidating or validating the communication via the communication path is performed according to the unique information of the external device 11. However, when the priority order of the first communication path 20a, the second communication path 20b, and the third communication path 20c is determined, it may be determined whether the process of validating or invalidating the communication via the communication path is determined based on the priority order. In this case, information indicating the priority order is included in the unique information.

More specifically, in the above-described first and second embodiments, the communication path of the finally established communication has been used more preferentially than the other communication paths to transmit and receive the data.

In this embodiment, however, the priority order of the mutual communication paths is determined in advance when two or more communications are established with regard to the first communication path 20a, the second communication path 20b, and the third communication path 20c. Accordingly, when the priority order of the communication path of the source after switching is higher than the communication path of the source before switching and the communication via the communication path of the source after switching is established, the communication path after switching is preferred to the communication path of the communication established before switching. Therefore, in this case, since data can be transmitted and received via the communication path after switching and the content of the source after switching is reproduced, the process of invalidating or validating the communication via the communication path is not performed.

On the other hand, when the priority order of the communication path of the source after switching is lower than the communication path of the source before switching, the communication path of the communication established before switching is preferred in spite of the fact that the communication via the communication path after switching is established. Therefore, there is the problem that the content of the source after switching is not reproduced by the reproduction unit 16a. Accordingly, when the priority order of the communication path of the source after switching is lower than the communication path of the source before switching, it is determined that it is necessary to perform the process of invalidating or validating the communication via the communication path and this process is performed.

Accordingly, the communication via the communication path (that is, the communication path with the higher priority order) before switching is invalidated and the communication via the communication path (that is, the communication path with the lower priority order) after switching is validated, and thus the data can be transmitted and received via the communication path after switching. Thus, the content of the source after switching can be reliably reproduced. Further, the process of invalidating or validating the communication via the communication path is performed when this process is necessary, and is not performed when this process is not necessary. Therefore, since the processing load of the control unit 16 can be reduced, the high speed can be achieved.

In the above-described embodiments, the first communication path 20a is configured as the wireless communication, and the second communication path 20b and the third communication path 20c are configured as the wired communication, but this configuration is merely an example and the embodiment is not limited thereto. That is, for example, all or some of the first communication path 20a, the second communication path 20b, and the third communication path 20c may be configured as wireless communication.

As another embodiment, the external device 11 may further include the communication-path control unit 16b even in the second embodiment, as described above in the first embodiment. In this case, as described above, the validation and the invalidation of the establishment of the communication via the communication path are not controlled on the side of the reproduction device 110, but the validation and the invalidation of the establishment of the communication via the communication path are controlled on the side of the external device 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A reproduction device comprising:
at least one processor configured to:
establish communication with one external device by enabling a first data communication path between the one external device and the reproduction device so that reproducible content can be supplied from the one external device via the first data communication path;
establish communication with the one external device by enabling a second data communication path between the one external device and the reproduction device such that reproducible content can be supplied from the one external device via the second data communication path;
establish communication with the one external device by enabling a third data communication path between the one external device and the reproduction device such that reproducible content can be supplied from the one external device via the third data communication path; and
upon receipt of an instruction to switch to the first data communication path from the second data communication path, invalidate the second data communication path and validate the first data communication path, the invalidation of the second data communication path being an operation of forming an interruption state of the second data communication path;
upon receipt of an instruction to switch to the second data communication path from the first data communication path, invalidate the first data communication path and validate the second data communication path, the invalidation of the first data communication path being an operation of forming an interruption state of the first data communication path;
upon receipt of an instruction to switch to the third data communication path from the first data communication path, invalidate the first data communication path;
upon receipt of an instruction to switch to the third data communication path from the second data communication path, invalidate the second data communication path;
upon receipt of an instruction to switch to the first data communication path from the third data communication path, validate the first data communication path without invalidating the third data communication path; and upon receipt of an instruction to switch to the second data communication path from the third data communication path, validate the second data communication path without invalidating the third data communication path.

2. The reproduction device according to claim 1, further comprising a display, wherein the at least one processor is further configured to: control the display to continuously display a first icon indicating that the first data communication path is connected, even when the first data communication path is invalidated and to continuously display a second icon indicating that the second data communication path is connected, even when the second data communication path is invalidated.

3. The reproduction device according to claim 1, wherein the at least one processor is further configured to:
output a reproduction command for the reproducible content supplied from the one external device; and
reproduce the reproducible content supplied from the one external device.

4. The reproduction device according to claim 3, wherein the at least one processor is further configured to:
determine whether the content supplied from the one external device has been reproduced, after a predetermined time has elapsed since the reproduction command, which is a first reproduction command, was output; and
output a second reproduction command, which corresponds to the first reproduction command, in a case where the reproducible content supplied from the one external device has not been reproduced by the time the predetermined time has elapsed since the first reproduction command was output.

5. The reproduction device according to claim 1, wherein the invalidation of the first data communication path includes:
invalidating a communication profile for the first data communication path, and
maintaining another communication profile for the first data communication path; and
the invalidation of the second data communication path includes:
invalidating a communication profile for the second data communication path, and
maintaining another communication profile for the second data communication path.

6. A reproduction system comprising:
one external device; and
a reproduction device comprising:
at least one processor configured to:
establish communication with the one external device by enabling a first data communication path between the one external device and the reproduction device so that reproducible content can be supplied from the one external device via the first data communication path;
establish communication with the one external device by enabling a second data communication path between the one external device and the reproduction device such that reproducible content can be supplied from the one external device via the second data communication path;
establish communication with the one external device by enabling a third data communication path between the one external device and the reproduction device such that reproducible content can be supplied from the one external device via the third data communication path; and upon receipt of an instruction to switch to the first data communication path from the second data communication path, invalidate the second data communication path and validate the first data communication path, the invalidation of the second data communication path being an operation of forming an interruption state of the second data communication path;
upon receipt of an instruction to switch to the second data communication path from the first data communication path, invalidate the first data communication path and validate the second data communication path, the invalidation of the first data communication path being an operation of forming an interruption state of the first data communication path;
upon receipt of an instruction to switch to the third data communication path from the first data communication path, invalidate the first data communication path;
upon receipt of an instruction to switch to the third data communication path from the second data communication path, invalidate the second data communication path;
upon receipt of an instruction to switch to the first data communication path from the third data communication path, validate the first data communication path without invalidating the third data communication path; and
upon receipt of an instruction to switch to the second data communication path from the third data communication path, validate the second data communication path without invalidating the third data communication path.

7. The reproduction device according to claim 1, wherein the invalidation of the first communication path means that the first communication path itself is connected, but is disabled to realize an incommunicable state and the invalidation of the second communication path means that the second communication path itself is connected, but is disabled to realize an incommunicable state.

8. The reproduction device according to claim 1, wherein the establishment of a communication path is a process of storing parameters used to perform various kinds of setting between devices performing communication in a memory and operating the devices based on the stored parameters.

9. The reproduction device according to claim 1, further comprising a memory that stores unique information of different types of external devices in association with classification information that classifies the different types of external devices into either a later preference type or an automatic switching type, the automatic switching type being associated with a type of external device in which a communication path via which data is transmitted and received is automatically switched to another communication path when the reproduction device receives an instruction to switch.

10. The reproduction device according to claim 9, wherein the unique information is a model number of the external device.

11. The reproduction device according to claim 1, wherein the at least one processor is further configured to: determine whether to start the process of validating or the process of invalidating based on a priority order.

* * * * *